US012279649B2

(12) United States Patent
Creager et al.

(10) Patent No.: US 12,279,649 B2
(45) Date of Patent: Apr. 22, 2025

(54) VAPORIZER COIL CONCENTRATE DELIVERY SYSTEM

(71) Applicant: LIT BRANDS LLC, Denver, CO (US)

(72) Inventors: Andrew Creager, Denver, CO (US); William Cowan, Westminster, CO (US); Zachary Taylor, Arvada, CO (US); Donald L. Creager, III, Denver, CO (US); Max Creager, Denver, CO (US)

(73) Assignee: LIT BRANDS, LLC

(*) Notice: Subject to any disclaimer, the term of this patent is extended or adjusted under 35 U.S.C. 154(b) by 514 days.

(21) Appl. No.: 17/647,518

(22) Filed: Jan. 10, 2022

(65) Prior Publication Data

US 2022/0225678 A1 Jul. 21, 2022

Related U.S. Application Data

(60) Provisional application No. 63/139,446, filed on Jan. 20, 2021.

(51) Int. Cl.

| | |
|---|---|
| ***A24F 40/42*** | (2020.01) |
| ***A24F 40/10*** | (2020.01) |
| ***A24F 40/46*** | (2020.01) |
| ***A24F 40/48*** | (2020.01) |

(52) U.S. Cl.

CPC .............. *A24F 40/42* (2020.01); *A24F 40/10* (2020.01); *A24F 40/46* (2020.01); *A24F 40/48* (2020.01); *H05B 2203/021* (2013.01)

(58) Field of Classification Search

CPC .......... A24F 40/42; A24F 40/10; A24F 40/46; A24F 40/48; A24F 40/20; A24F 40/485; H05B 2203/021

See application file for complete search history.

(56) References Cited

U.S. PATENT DOCUMENTS

| | | | | |
|---|---|---|---|---|
| 9,549,573 | B2 * | 1/2017 | Monsees | H05B 3/04 |
| 10,448,671 | B2 | 10/2019 | Hopps et al. | |
| 10,757,759 | B2 | 8/2020 | Bell et al. | |
| 10,986,867 | B2 * | 4/2021 | Bowen | A24F 40/40 |
| 11,202,470 | B2 * | 12/2021 | Rabinowitz | A24B 15/30 |
| 2014/0123989 | A1 * | 5/2014 | LaMothe | A61M 15/0003 131/328 |
| 2014/0261488 | A1 * | 9/2014 | Tucker | A24F 40/50 131/328 |
| 2014/0345635 | A1 * | 11/2014 | Rabinowitz | A24B 15/167 131/352 |

(Continued)

FOREIGN PATENT DOCUMENTS

WO 2017/214517 A1 12/2017

*Primary Examiner* — Truc T Nguyen

(74) *Attorney, Agent, or Firm* — Martensen IP; Michael C. Martensen

(57) ABSTRACT

A concentrate vapor delivery system places a viscous concentrate at an optimal location for vaporization while simultaneously protecting the heating elements that enable vaporization from damage. Concentrate is positioned proximate to the heating source on a delivery apparatus whereby heat from the heating source liquefies the concentrate. Upon liquification the concentrate flows along the delivery device toward the heating source and into an environment of higher temperature, eventually vaporizing thereby releasing the desired vapor effect.

13 Claims, 28 Drawing Sheets

(56) References Cited

U.S. PATENT DOCUMENTS

| | | | | |
|---|---|---|---|---|
| 2014/0366898 | A1* | 12/2014 | Monsees | A24F 40/30 131/329 |
| 2016/0106936 | A1* | 4/2016 | Kimmel | A24F 40/485 392/404 |
| 2016/0150828 | A1* | 6/2016 | Goldstein | H05B 6/36 392/387 |
| 2017/0354180 | A1* | 12/2017 | Fornarelli | H05B 3/04 |
| 2017/0354186 | A1 | 12/2017 | Johnson et al. | |
| 2018/0077967 | A1 | 3/2018 | Hatton et al. | |
| 2018/0221604 | A1 | 8/2018 | Trzecieski | |

* cited by examiner

VAPORIZER COIL CONCENTRATE DELIVERY SYSTEM

RELATED APPLICATION

The present application relates to and claims the benefit of priority to U.S. Provisional Patent Application No. 63/139,446 filed 20 Jan. 2021 which is hereby incorporated by reference in its entirety for all purposes as if fully set forth herein.

BACKGROUND OF THE INVENTION

Field of the Invention

Embodiments of the present invention relate, in general, to personal vaporizers and more particularly to delivery of a concentrate in proximity to, and protection of, heating coils within personal vaporizers.

Relevant Background

It is well known that plants can synthesize chemical compounds that benefit the plant in many ways. These advantages include reactants in biological reactions, for defense against certain insects and animals, and to attract other insects or animals that are beneficial to the plant.

Many of the chemical compounds synthesized by plants have also been found to have favorable or beneficial effects when consumed by humans. These effects can be either short-term or long-term, and they may impact a human's health, mental state, or both. As a result, humans have adopted the consumption of plant-synthesized chemical compounds (also known as "phytochemicals") for both medicinal and recreational purposes.

As a means for consuming phytochemicals, humans adopted the practice of smoking, where a substance containing phytochemicals, such as tobacco, is burned in a way that the resulting smoke may be inhaled or tasted. Released with the smoke and subsequently inhaled or tasted by the smoker are phytochemicals, such as nicotine, that enter the body of the smoker. Recently, however, smoke inhalation has become associated with a detrimental impact on a smoker's health. As a result, smokeless alternatives to smoking have become more popular in society.

A popular alternative to smoking is the use of vaporizers. Vaporizers work by heating a substance to a temperature sufficient to cause the release of chemicals within the substance without burning or combusting the substance. Using a substance containing phytochemicals in a vaporizer allows users to taste or inhale the released phytochemicals without inhaling any smoke, enabling users to achieve effects like those achieved by smoking without being subjected to the negative consequences of smoke inhalation. Vaporizers have been designed to accommodate a wide variety of substances, including plant matter and plant matter extracts known as concentrates. Plant matter extracts are available in both a solid state, such as a wax, or in liquid states of various viscosities, such as oils.

Current vaporizer designs typically use conduction to heat and vaporize substances. A heating element, such as a heating coil is often used to achieve conduction, which is often in direct contact with the substance to be vaporized. However, due to the limited surface area of many heating elements, heat is often unevenly distributed across the substance being vaporized. This uneven heat distribution results in substance residue that is either wasted because it cannot be heated sufficiently for vaporization or hardens and "bakes on" to vaporizer components.

Alternatively, some vaporizer designs utilize convection or combination of convection and conduction to heat and vaporize substances. Convection and convection-conduction designs provide for more even heat distribution compared to conduction-only designs, but they also have their drawbacks. For example, convection and convection-conduction designs are still subject to substance residue hardening and "baking on" to vaporizer components. This is due in part to a constant amount of heat being applied to a substance with a volume that continually decreases throughout the vaporization process, and because heat is applied unevenly throughout the substance being vaporized.

Cleaning the heating elements or heating chamber in current vaporizer designs remains a challenge. Using a cleaning solvent is difficult given the backed-on nature of the residue and applying any sort of mechanical means to dislodge the residue may irreparably damage the underlying heating coils. It is desirable to incorporate into the heating chamber a protective bar or barrier that, while proximate to the heating elements, does not impeded operation or efficiency yet serves to protect the same elements from cleaning of residue from the heating chamber while enhancing heat distribution and the vaporization process. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Vaporizers are configured to heat a substance concentrate to its vapor point through either conduction, convection or a combination of conduction and convection. The concentrate vapor delivery system of the present invention uniformly places the substance concentrate in proximity of heating elements resident in a vaporizer for efficient vaporization while at the same time protecting the heating elements from damage. In one embodiment the concentrate vapor delivery system of the present invention includes a cylindrical heating vessel having a central axis and an interior cylindrical surface. One or more heating elements are positioned within the cylindrical heating vessel and a concentrate delivery apparatus extends from the interior cylindrical surface into the interior of the cylindrical heating vessel, proximate to the heating elements, configured to accept a concentrate suitable for vaporization.

In one version of the present invention the concentrate delivery apparatus is movably proximate to the one or more heating elements. In another version the concentrate delivery apparatus is internally heated using an internal heating coil or directed heat from the heating elements. In one instance the concentrate delivery apparatus spans the heating vessel perpendicular to and traversing the central axis while in others the apparatus circumscribes the interior of the heating vessel.

In one embodiment the concentrate delivery apparatus of the present invention spans the vessel and includes a curvilinear surface configured to transport liquified concentrate from its upper edge to a lower edge, where, as it is close to the heating elements, vaporizes liquified concentrate. In one version of the present invention the apparatus has two curvilinear surfaces, both of which are convex and that terminate at a common lower edge.

The concentrate delivery apparatus spanning the vessel can include a variety or cross-sectional shapes. They may include, among others, a rectangular cross-section, a circular cross-section, a hollow tube with a circular cross-section, a semicircular cross-section, and a triangular cross-section. The apparatus can also include a conical funnel pointed toward the heating elements with a smaller opening and a larger opening, the small opening oriented below the large opening with the smaller opening proximate to a lower portion of the heating vessel wherein the heating elements are located. The inner surface of the heating vessel can also include a plurality of perturbations (pips) that are operable as a concentrate delivery apparatus.

Another feature of the present invention is that the concentrate delivery apparatus is movably and/or fixedly positioned within the heating vessel relative to the central axis thereby to be adjustably proximate to the one or more heating elements.

In another version of the present invention the concentrate delivery apparatus extends uniformly inward from the interior cylindrical surface of the heating vessel toward the central axis of the heating vessel forming a lip or edge. This edge can be combined with the other crossbars spanning the heating vessel. As with the bar that spans the vessel the concentric ring (with respect to the wall of the cylindrical vessel) is movably positioned withing the heating vessel to be closer to the heating elements as necessary.

In another version of the present invention, the concentrate delivery apparatus includes an extension forming an interior edge (ring) extending from the interior cylindrical surface toward the central axis. A curvilinear surface extends from this interior edge back to the interior cylindrical surface of the heating vessel thereby joining the interior cylindrical surface of the heating vessel at a lower edge. In this version the curvilinear surface is configured to transport liquified concentrate from the interior edge of the concentrate delivery apparatus to the lower edge of the concentrate delivery apparatus. As the lower edge is proximate to the one or more heating elements, the liquified concentrate vaporizes.

One or more of the surfaces of the ring extending inward form the inner surface of the heating vessel may be curvilinear and possess convex or concave characteristics. In other embodiments one or more of the surfaces may be flat (linear).

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
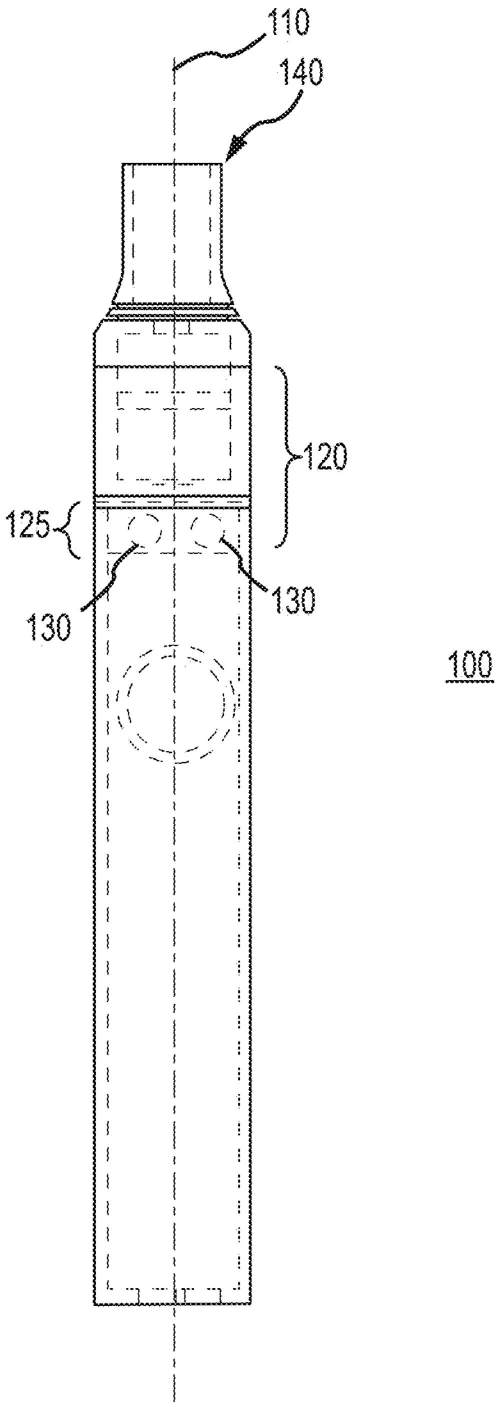
FIG. 1 a representative electronic vaporizer suitable for use with the vaporizer (heating) coil concentrate delivery system of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A concentrate vapor delivery system of the present invention places a substance (phytochemical) concentrate at an optimal location for vaporization while simultaneously protecting the heating elements enabling vaporization from damage. A personal vaporizer or electronic cigarette transforms a substance of choice to its vapor point. The created vapor is drawn through a channel by which the temperature of the air/vapor combination is controlled/reduced for consumption. The various designs of vaporizers, well known to one of reasonable skill in the relevant art, place a substance concentrate (often referred to singularly as a "concentrate") in proximity of a heating source. Upon vaporization, a vapor and air combination are either drawn or expelled from the vaporizing chamber through a vapor path before ultimately being delivered to the user.

The concentrate may be of many forms. In one version of the present invention the concentrate is a viscous substance much like a wax. The concentrate, according to one embodiment of the present invention, is positioned proximate to the heating source whereby heat from the heating source liquefies the concentrate or causes it to sublime. Upon liquification the concentrate flows toward the heating source and into an environment of higher temperature. Eventually the liquid vaporizing releasing the desired vapor effect.

When the vaporization is incomplete residue is created and deposited on surfaces proximate to the heating source. In most instances the heating source is one or more metallic coils suspended within a chamber. In other instances, the heating element may be disk-like in shape, connected to a power source, and comprised of high-temperature resistant material, such as glass, coated with a material capable of converting electrical energy into heat, such as electrically conducting carbon nanotubes or graphene. In either case, the heating element emits enough heat to convert vaporizable concentrate into vapor, gas, or aerosol when near or direct contact with the heating element. The shape of the heating element concentrate delivery apparatus of the present invention uses an even distribution of heat gained by convection or conduction across the surface of the heating element and allows for a greater surface area with which vaporizable material concentrate may encounter the heat source.

While designs of heating elements are optimized to produce efficient vaporization, the vaporization of the concentrate is often incomplete. The remaining concentrate forms an undesirable residue which must be periodically removed. According to one embodiment of the present invention, the concentrate delivery apparatus forms a protective barrier suspended proximate to the heating element thereby protecting the heating element from damage incurred from scraping the residue from the heating chamber or using caustic solvents. In one version of the present invention an apparatus (bar or the like) is positioned approximately 3-5 mm above the heating element, intersecting the centerline axis of the heating chamber. In other embodiments the protective barrier mirrors the heating element configuration, albeit positioned proximate to each.

The present invention adjustably positions one or more edges of the delivery device proximate to the heating coils on which to deposit the concentrate. As the heating coils age or as a power from a batter source or the like diminishes, the coils become less efficient thereby producing less heat. Accordingly, the concentrate must be positioned closer to the heating coils to evoke the same degree of vaporization. Yet upon introduction of a new coil or a new power source (battery) the space between the concentrate and heating coil must be reestablished to its original settings. One aspect of the present invention is the ability to position and adjust the deposition of concentrate relative to the heating coil.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements, or features may be exaggerated for clarity.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

FIG. 1 presents an electronic vaporizer having a concentrate vapor delivery system according to one or more embodiments of the present invention. While personal vaporizers may take many forms, each includes components to heat a substance producing a vapor that is thereafter inhaled by a user. The vaporizer shown FIG. 1 is representative of devices which accept a concentrate substance and produces a vapor thereafter for consumption. Such devices generally include electronic components connectively coupling a power source, such as batteries or the like, to a heating element. An air path is established such that vapors produced by the heating element(s) can be mixed with ambient air cooling the vapor for consumption.

In the embodiment presented in FIG. 1, the vaporizer 100 is tubular in shape with two heating coils 105 positioned in parallel perpendicular to the central axis 110 of the tubular vaporizer. One of reasonable skill in the relevant art will appreciate that the shape of the vaporizer is not controlling as to the scope and innovation of the present invention. Indeed, vaporizers of a variety of shapes can employ the inventive aspects to the present invention without departing from the scope of this disclosure.

Similarly, the positioning, number, shape, and construction of the heating elements is one of a design choice and should not be viewed as a controlling feature of the invention. While FIG. 1 presents two heating coils arranged in parallel with each coil's central axis perpendicular to the central axis of the tubular vaporizer, other configurations are possible and are indeed contemplated. For example, the heating coil may comprise a single coil with the coil's central axis bisecting and perpendicular to the central axis of the tubular vaporizer. In another embodiment the heating coil's central axis may coexist with the central axis of the vaporizer and in yet another embodiment, the heating coil or device may be an expanding circular planar element configured to be perpendicular to the central axis of the tubular vaporizer.

In each instance the heating elements produce heat encased within a heating vessel. In this instance, and according to one embodiment of the present invention, the heating vessel 120 is cylindrical. The cylindrical heating vessel includes a lower portion 125 at which the heating element(s) 130 are located and a cylindrical interior surface circumscribing a central axis. The cylindrical heating vessel 120 extends away from the lower portion 130 housing the heating elements 130 to an upper edge 140 open to the environment or to which a mouthpiece (or the like) is attached.

Figure 2A:
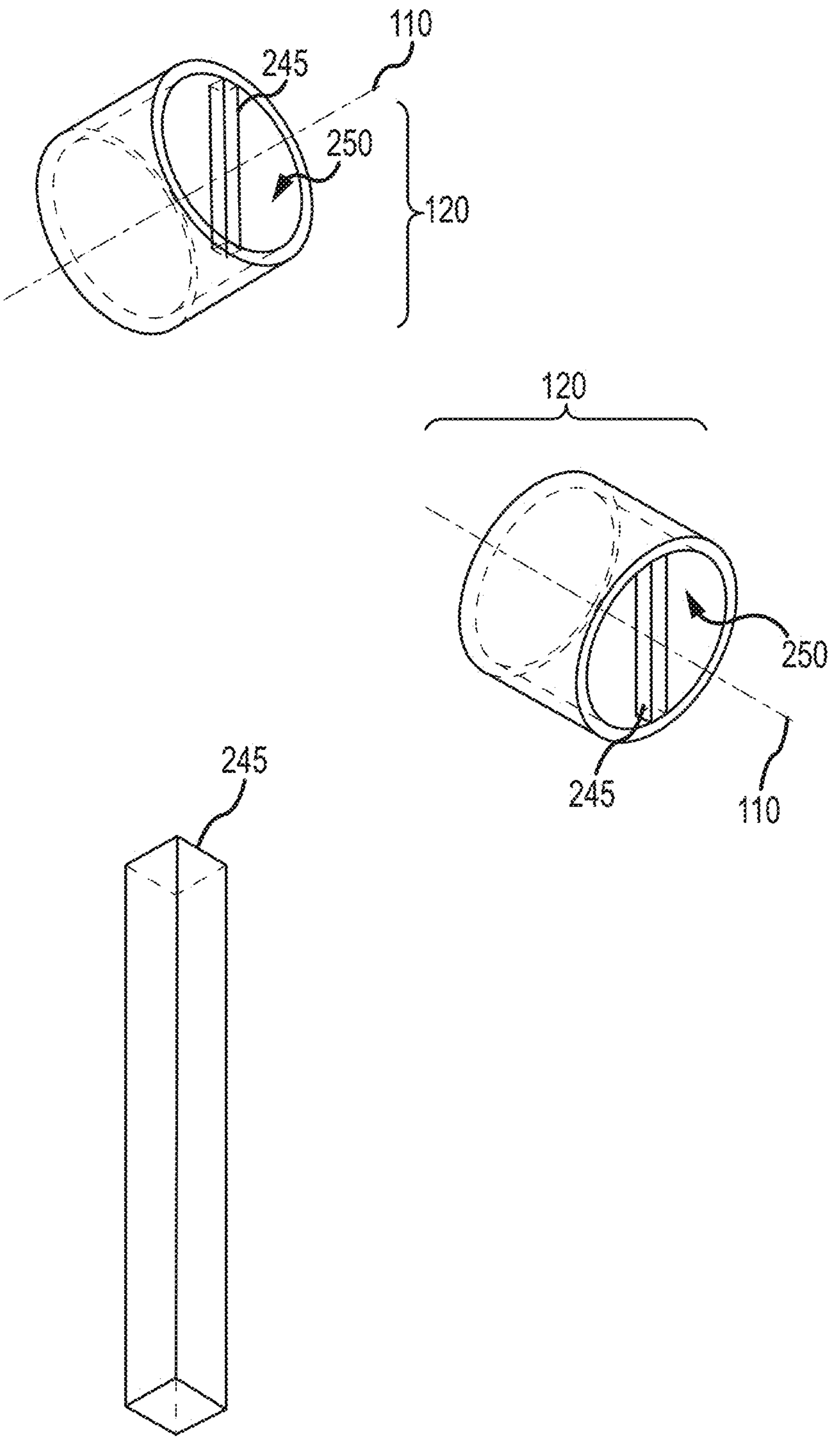
FIGS. 2A, 2B and 2C are perspective views of one embodiment of a vaporizer coil concentrate delivery system spanning the heating vessel having a rectangular cross-section.
Figure 2B:
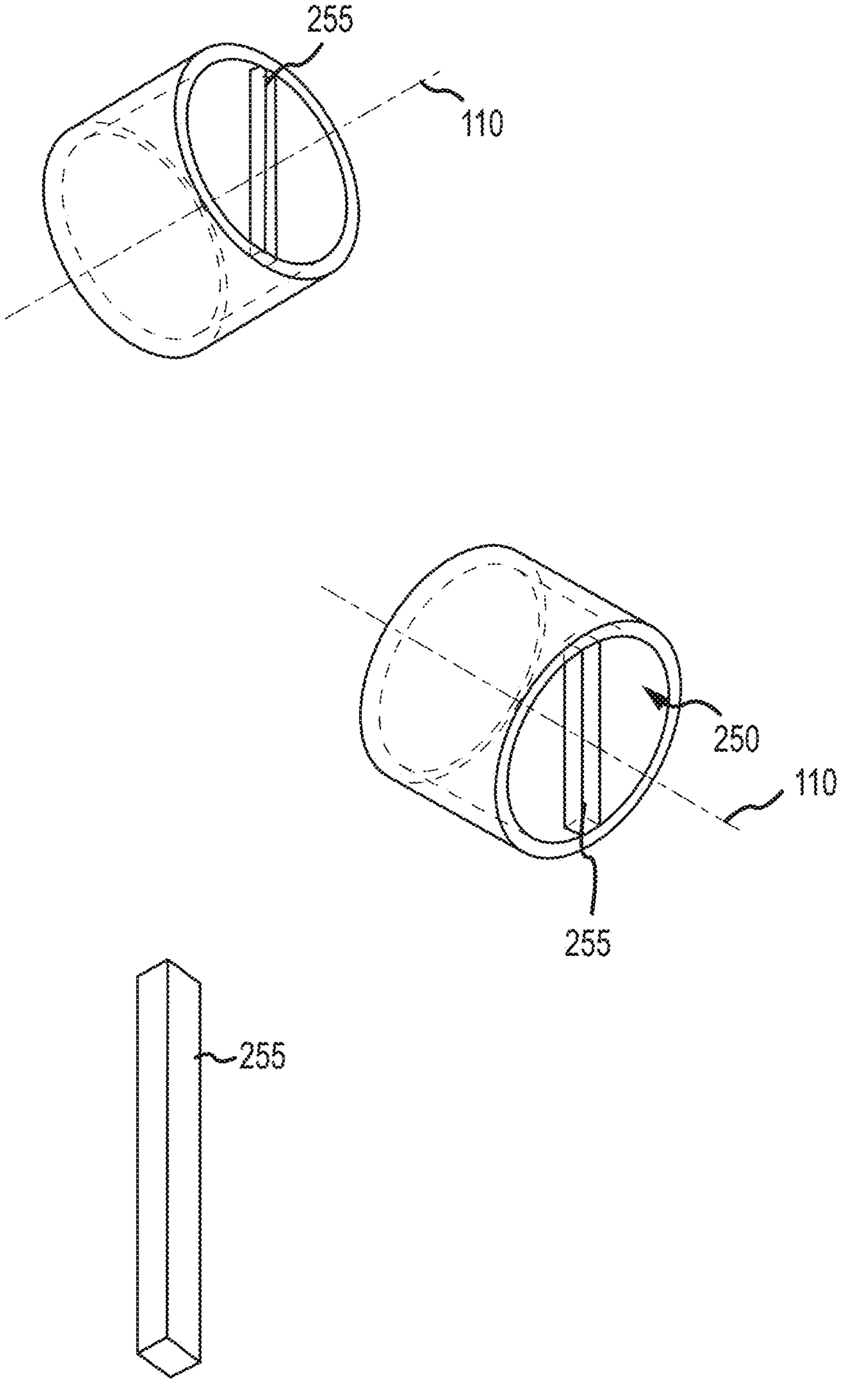
Figure 2C:
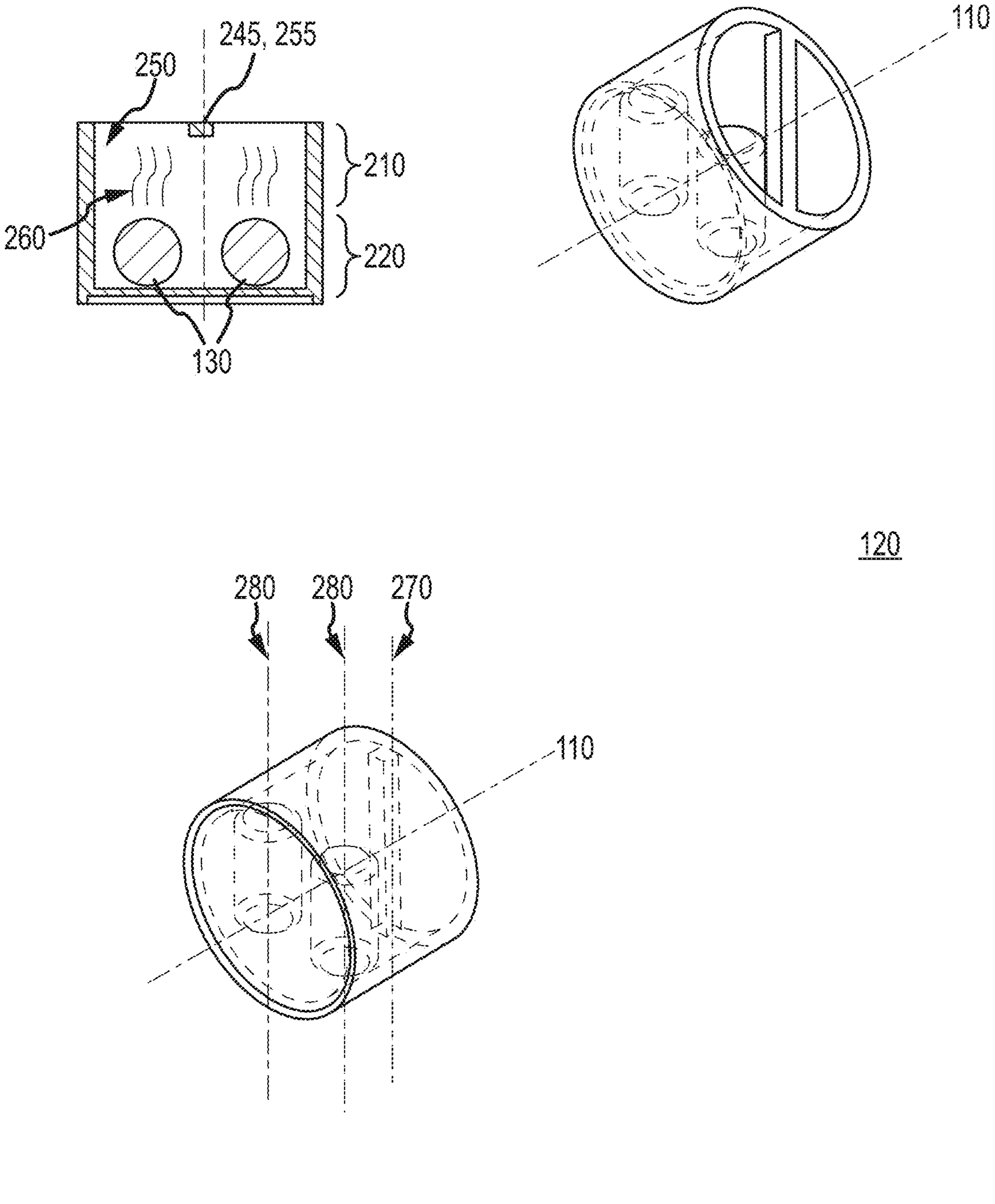

FIGS. 2A and 2B are perspective views of one embodiment of a vaporizer coil concentrate delivery system. In the embodiment shown in FIG. 2A the heating vessel or chamber 120 is depicted as a hollow cylinder having a lower portion 220 and an upper portion 210. One or more heating elements 130 (as seen in FIG. 2C) are typically positioned at or near the lower portion 220 of the cylinder enabling heat to rise upward toward the upper portion 210 of the heating vessel. A concentrate delivery apparatus 245 extends from the interior cylindrical surface 250 of the cylinder and is configured to accept a concentrate suitable for vaporization. In the version of the present invention shown in FIG. 2A, the concentrate delivery apparatus 245 is solid bar having a square cross-section spanning the interior area of the cylinder. The cross-section of an alternative concentrate delivery apparatus 255 shown in FIG. 2B is rectangular illustrating diversity in the innovative concept. In both cases the concentrate delivery apparatus traverses the central axis 110 of the heating vessel. In the instance in which the two heating elements 130 are positioned in the lower portion 220 of the heating vessel, the concentration delivery apparatus 245, 255 is co-aligned with the heating elements (parallel). As heat 260 from the heating elements rise the heat liquefies any concentrate deposited on the sides of the concentrate delivery apparatus. The liquified concentrate expands/travels along the length of the bar as it vaporizes. One of reasonable skill in the relevant art will appreciate that while a single concentrate delivery apparatus is shown spanning the heating vessel, in other embodiments, two or more concentrate delivery apparatus may span the interior of the cylinder equally offset, in one embodiment, from the central axis FIG. 2C further illustrates the position of the concentrate delivery apparatus with respect to the heating vessel 120 and the heating elements 130. The concentrate delivery apparatus extends from the inner surface 250 of the heating vessel, spanning the cylinder. The axis of the apparatus 270 is, in this configuration, aligned (parallel) with the central axis 280 of each heating coil 130 and positioned above and between the two coils 130. As will be apparent to one of ordinary skill in the relevant art, other orientations and configurations are possible consistent and withing the scope of the present invention.

Figure 3A:
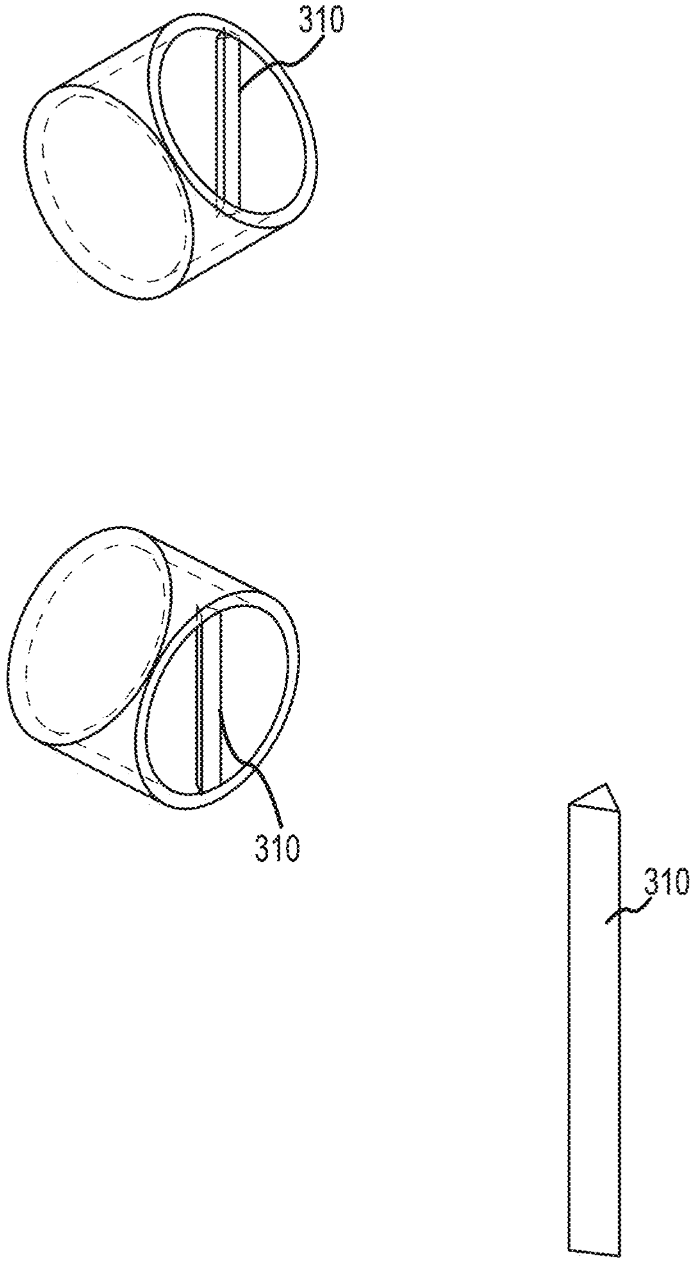
FIGS. 3A and 3B are perspective views of one embodiment of a vaporizer coil concentrate delivery system spanning the heating vessel having a triangular cross-section.
Figure 3B:
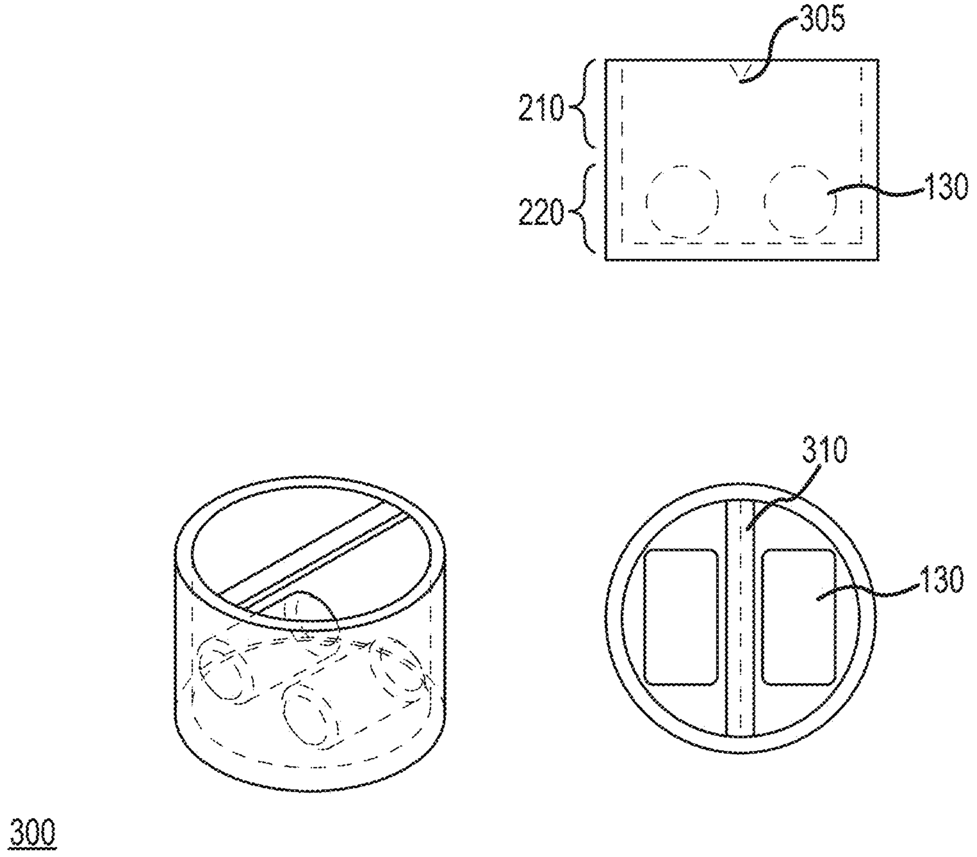

FIG. 3A is a perspective view of one embodiment of a vaporizer coil concentrate delivery system 300 spanning the heating vessel having a triangular cross-section. In this example, the vertex 305 of the triangle 310 is oriented toward the lower portion 220 of the heating vessel 120. Concentrate deposited on the concentrate delivery apparatus 310 will liquefy and flow toward the vertex 305 and along the length of the apparatus. Like FIG. 2C, FIG. 3B presents the concentrate delivery apparatus 310 shown in FIG. 3A positioned above two heating coils 130 within the heating vessel. The concentrate delivery apparatus is, in this embodiment, parallel with the heating coils and with the vertex of the triable positioned above the space between the two coils.

Figure 4:
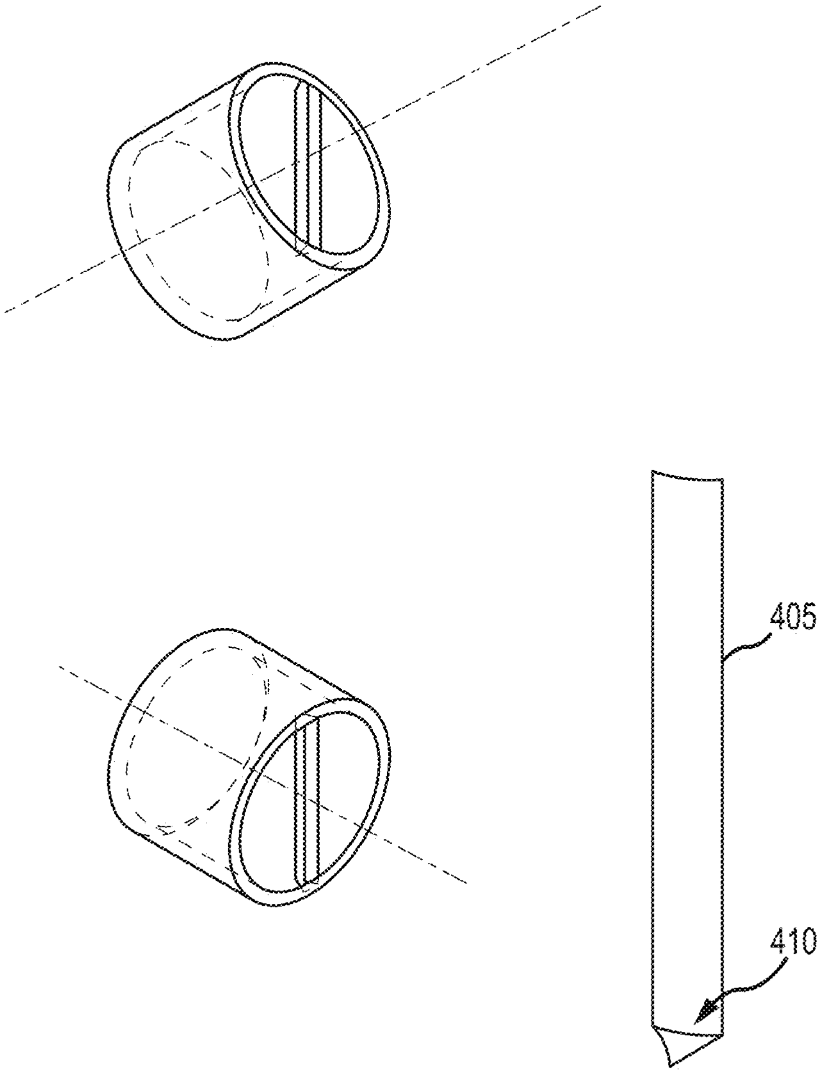
FIG. 4 is a perspective view of one embodiment of a vaporizer coil concentrate delivery system spanning the heating vessel having a triangular cross-section with curvilinear sides.
Figure 5:
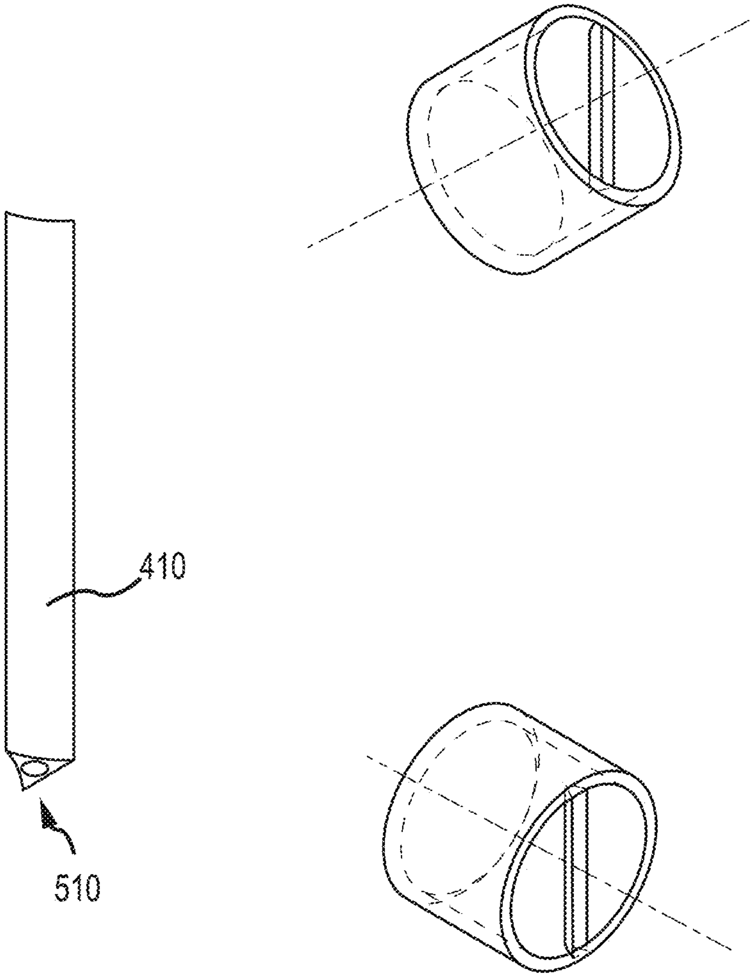
FIG. 5 is a perspective view of one embodiment of a vaporizer coil concentrate delivery system spanning the heating vessel having a triangular cross-section with curvilinear sides and a void throughout the cross-section suitable for internal heating of the delivery system.

The concentrate delivery apparatus of FIG. 4 similarly presents a triangular cross-section 405 but the sides of the triangle ending at the downward facing vertex are curvilinear 410. In this example both sides are uniformly concave. The concentrate delivery apparatus of FIG. 5 maintains the curvilinear triangular sides 410 while incorporating a central channel/hole 510 passing throughout the concentrate delivery apparatus. The central channel 510 is configured to accept heat from a heating source to aid in the liquification/vaporization of the concentrate. In one embodiment a heating coil is interposed within the channel while in another embodiment heat from the heating coils located in the lower portion of the heating vessel is directed through the channel/hole. In doing so the entirety of the concentrate delivery apparatus is heated making vaporization more efficient. And while the central channel/hole 510 shown in FIG. 5 is associated with a triangular cross-section, the same concept can equally apply to the rectangular cross-sections of FIG. 2.

Figure 6:
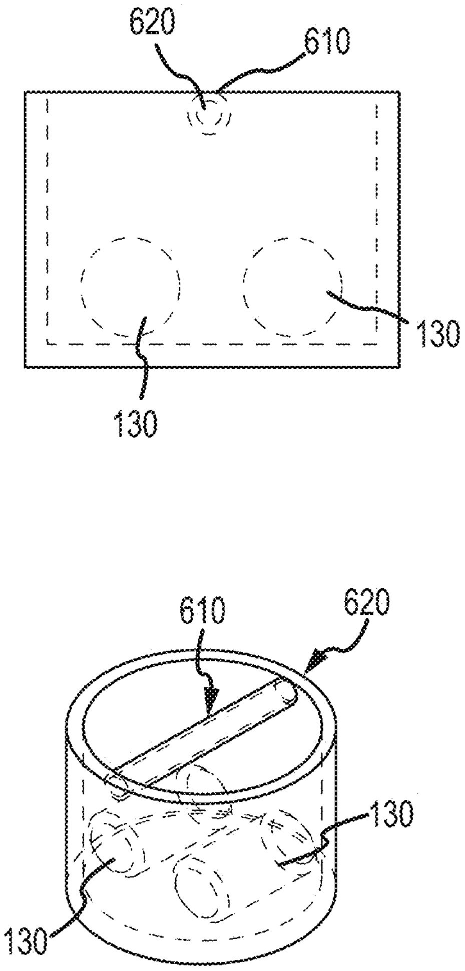
FIG. 6 present one embodiment of a vaporizer coil concentrate delivery system with a circular cross-section spanning the heating vessel wherein the device spanning the vessel includes a void (hole) throughout its length suitable for internal heating of the delivery system.

FIG. 6 provides another embodiment of a concentrate delivery apparatus. In this instance the apparatus the concentrate delivery is a rod 610 with a circular cross-section spanning the heating vessel much like those of the rectangular and the triangular cross-sections. The embodiment shown in FIG. 6 includes a void or channel 620 within the rod. As previously discussed, the channel can act as a conduit for heat or include a heating coil 130 in which the coil itself heats the concentrate delivery apparatus.

Figure 7:
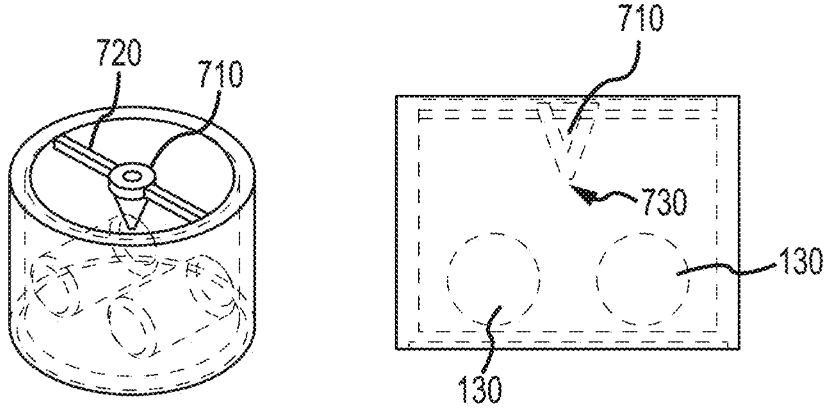
FIG. 7 are views of a conical concentrate delivery system including a conical section suspended over heating coils, according to one embodiment of the present invention.

FIG. 7 pesetas a conical 710 concentrate delivery apparatus. The conical device 710 is suspended above the heating coils 130 supported by a bar 720 that traverses the heating vessel. The cone is tapered having a larger portion coincident with the upper surface of the bar, which is, in this case coincident with the upper portion of the heating vessel. The cone of the concentrate delivery apparatus tapers to a point having a hole 730. The hole is directed above the space between the heating coils. Other orientations and configurations are contemplated and within the scope of the present invention. In one mode of use, a use would place concentrate or other viscous substance in the cone. Heat from the heating coils would liquefy the concentrate. The liquified concentrate would thereafter flow through the hole 730 and drop between the heating coils 130 where it would be vaporized.

Figure 8A:
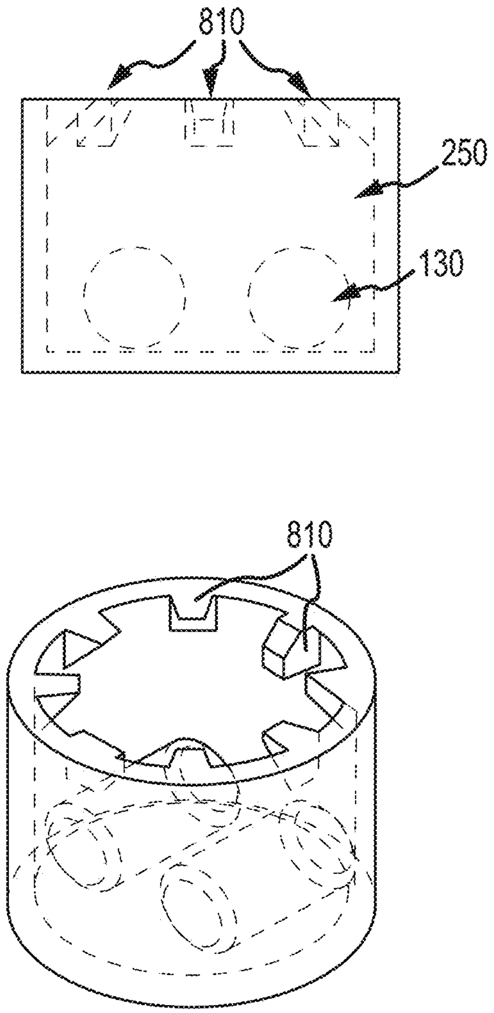
FIGS. 8A and 8B present a concentrate delivery system having perturbations extending from the inner surface of the heating vessel symmetrically positioned around the inner surface.
Figure 8B:
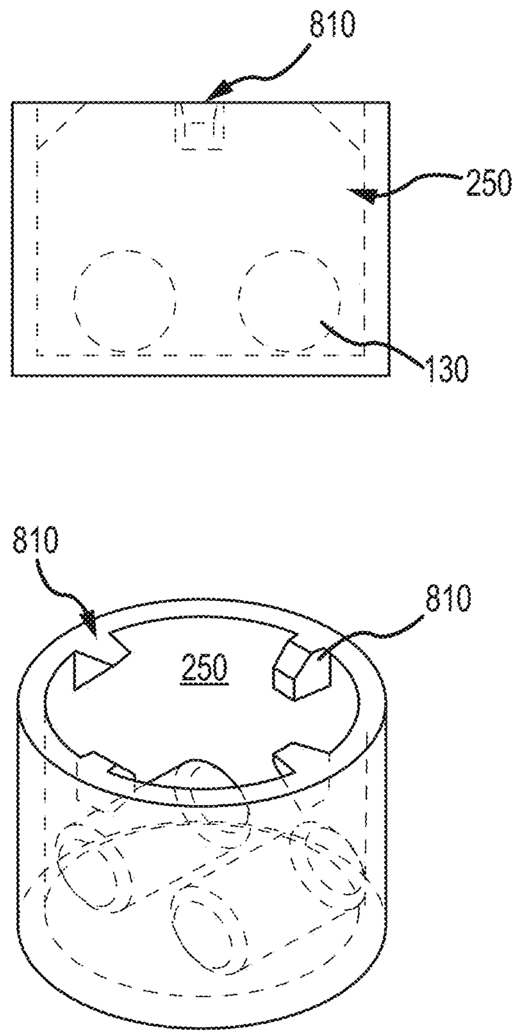

FIGS. 8A and 8B present a series of perturbations 810 or pips extending from inner surface 250 of the cylindrical heating vessel. In this embodiment there are eight trapezoidal pips 810 oriented toward the central axis of the heating vessel. The number of perturbations may vary. For example, in other embodiments there may be 4, 6 or 10 such perturbations. Each pip 810 provides multiple edges on which concentrate can be deposited.

Figure 9A:
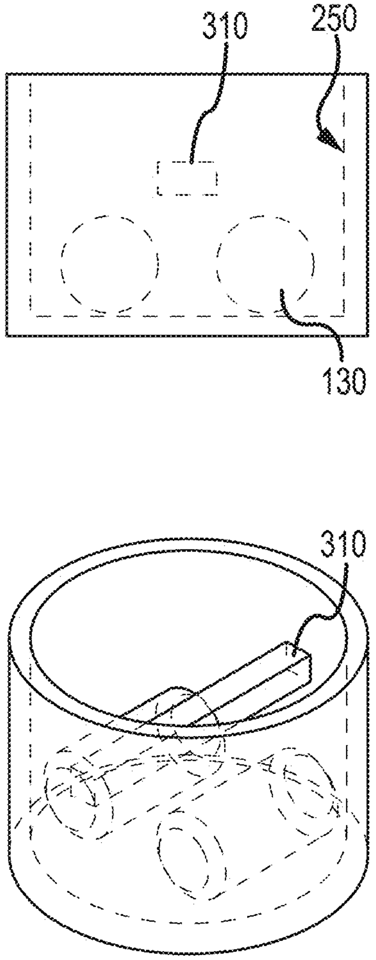
FIGS. 9A-9E show variations of the concentrate delivery systems presented in FIGS. 2-8 positioned within the heating vessel rather than at the upper edge or upper portion of the heating vessel.
Figure 9B:
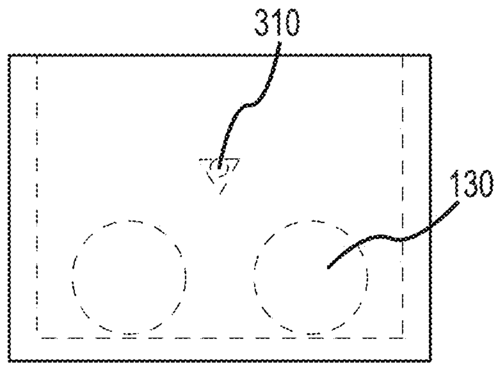
Figure 9B:
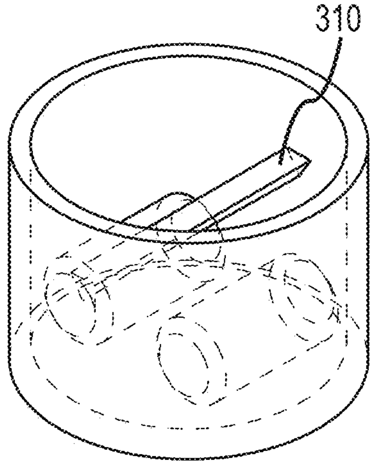
Figure 9C:
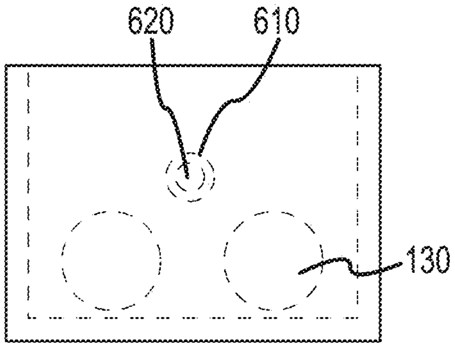
Figure 9C:
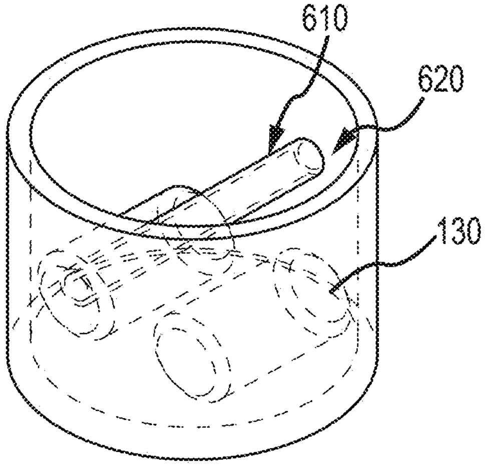
Figure 9D:
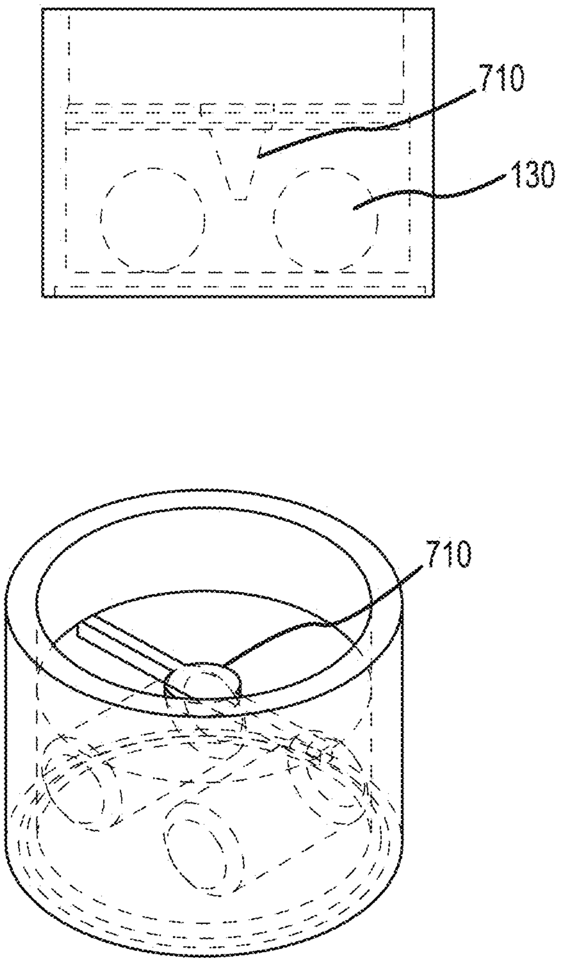
Figure 9E:
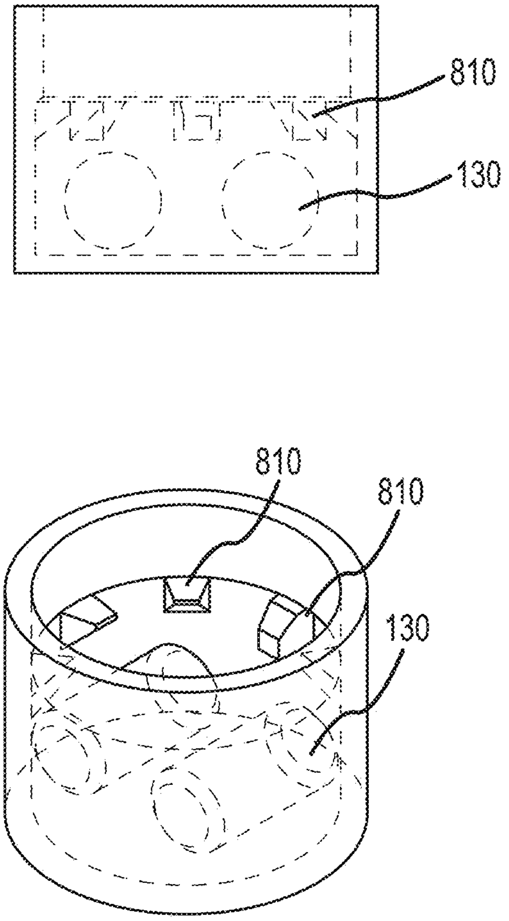

FIGS. 9A-9E illustrate the concentrate delivery apparatus of the prior depictions (rectangular 225, circular 610, triangular 310, conical 710 and perturbations 810) positioned lower within the heating vessel and closer to the heating coils. In one embodiment the location of the concentrate delivery apparatus is selectable and adjustable. FIGS. 9A-9E presents each of the prior configurations located near the midpoint of the heating vessel and near the heating elements. FIGS. 9B and 9C reinforce that the concentrate delivery apparatus can incorporate a heating means 610, 620 such as channeled heat from the heating elements or a separate heating coil.

One of reasonable skill in the relevant art will also recognize that the components presented herein can be combined. For example, a conical section 710 can be coupled with a triangular cross bar 310. Similarly, a cross bar 255, 610, 310, can be combined with perturbations 810 extending from the inner surface 250 of the heating vessel. These and other combinations are within the scope of the present invention and are indeed contemplated.

Figure 10:
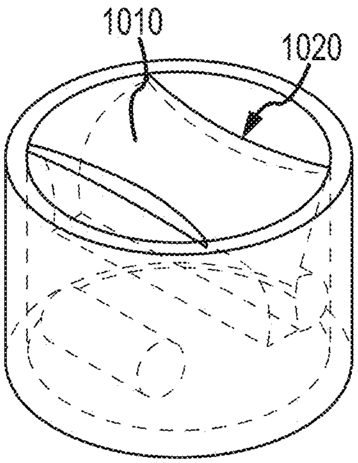
FIG. 10 is a perspective view of one embodiment of a vaporizer coil concentrate delivery system spanning the heating vessel having a triangular cross-section with curvilinear sides orientated proximate to two heating coils.

FIG. 10 is a perspective view of one embodiment of a vaporizer coil concentrate delivery system spanning the heating vessel having substantially a triangular cross-section 1010 with curvilinear sides 1020 orientated proximate to two heating coils. The concentrate delivery apparatus of FIG. 10 combines features of the rectangular 255 and triangular 310 cross-sections while optimizing heat distribution to any deposited concentrate. It too can include an internal means of heating as described above.

The upper surface of the concentrate delivery apparatus of this embodiment is planar and coincident with the upper portion of the heating vessel. The apparatus engages the interior surface of the cylinder with equal arcs leaving symmetric spaces on either side through which the vapor can escape. The upper edge of the apparatus is curvilinear having an arc opposite that of the shape of the interior surface of the heating vessel. The curvilinear upper edge is sharp having a vertical portion before transitioning into a curvilinear, concave arc. The lower arc of the apparatus terminates in a flat edge that spans the heating vessel, separating two heating coils.

The concentrate delivery apparatus shown in FIG. 10 illustrates the ability to deliver concentrate close to the heating coils. In the embodiment shown in FIG. 10 the heating vessel includes two heating coils 130 lying side by side in parallel and yet perpendicular to the central (longitudinal) axis of the heating vessel. The concentrate delivery apparatus is parallel to the heating coils and configured to place the lower edge of the apparatus between the coils. The concave curvature inner walls of the apparatus channels heat from the coils upward toward the upper edge. Waxie or viscous concentrate deposited on the upper edge of the apparatus will liquefy from the heat and travel downwards along the curved face toward the heating element. As the liquid reaches the lower edge the liquid vaporizes.

Features shown in FIG. 10 can be incorporated into other concentrate delivery apparatuses based on the orientation and configuration of the heating elements within a heating vessel. Moreover, the position of the apparatus vertically can be modified/adjusted to place the concentrate at the right distance from the heating coils to cause vaporization.

The concentrate delivery apparatus of the present invention captures a concentrate whereby it may liquefy in the presence of heat and thereafter vaporized. In some instances, the apparatus transports liquified concentrate toward the heating source to enhance the vaporization process. The versions shown in FIGS. 2-10 span the cylindrical heating vessel. In an alternative approach, according to another embodiment of the present invention, the concentrate delivery apparatus circumvents the interior surface of the heating vessel as an interior ring.

Figure 11A:
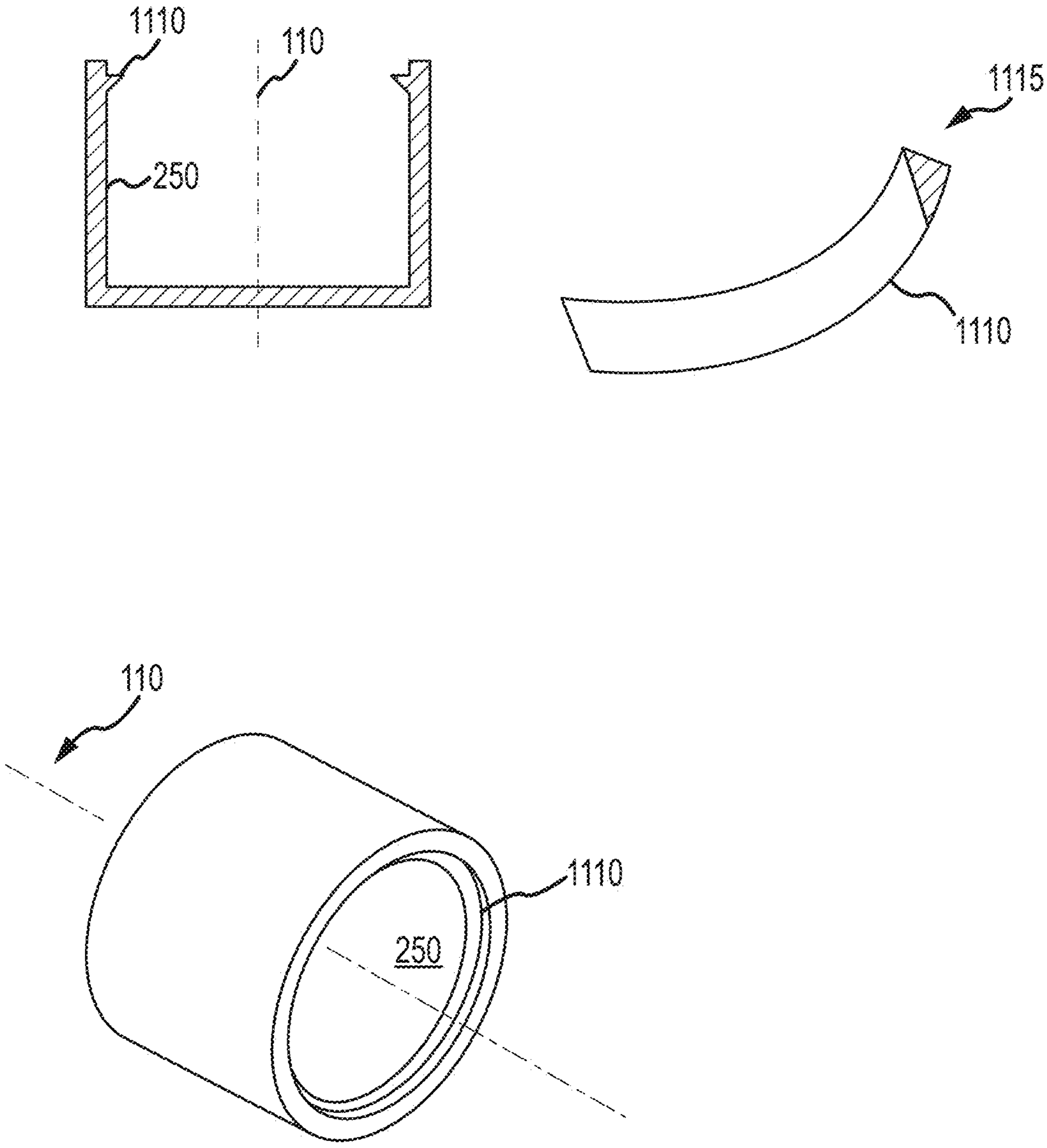
FIGS. 11A and 11B are each perspective views of one embodiment of a vaporizer coil concentrate delivery system circumscribing the interior cylindrical surface of the heating vessel having a triangular cross-section.
Figure 11B:
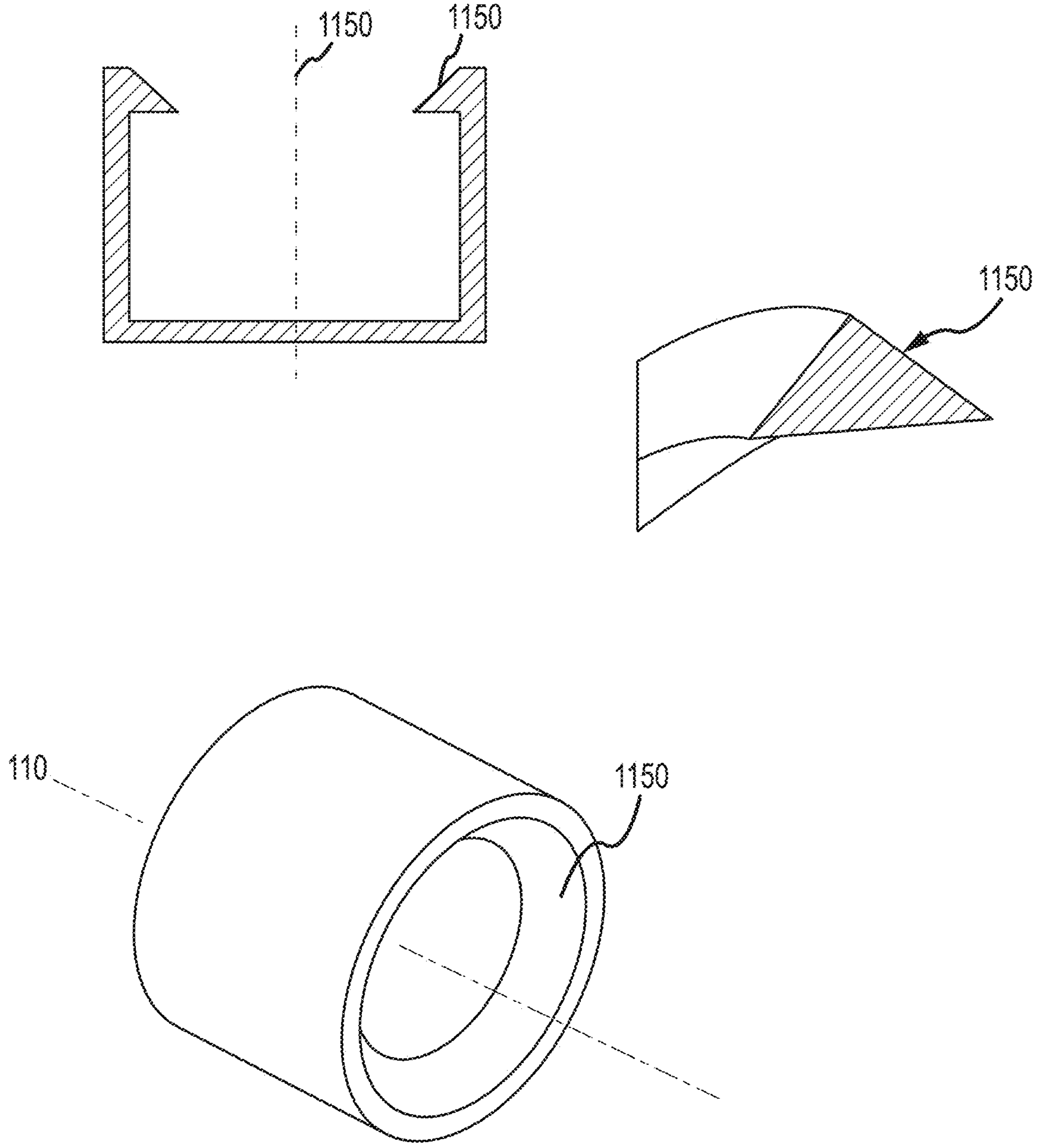

FIGS. 11A and 11B are each perspective views of one embodiment of a vaporizer coil concentrate delivery system 1110 circumscribing the interior cylindrical surface 250 of the heating vessel having a triangular 1115 cross-section. In this version of the present invention, the concentrate delivery apparatus is a continuous ring 1110 circumscribing the interior surface of the heating vessel. A cross-section 1115 of the apparatus reveals a triangular shape with straight lines. While the apparatus curves to match the interior shape of the cylinder, the slope of the face of the apparatus is constant. FIG. 11A presents a version in which the triangular shape of the ring extends inward toward the central axis moving from the upper portion toward the lower portion. At the point the apparatus terminates an edge is formed, whereby the lower surface (lower portion) of the apparatus returns to mate with the inner surface of the heating vessel. The lower surface of the apparatus and the inner surface of the heating vessel are perpendicular.

FIG. 11B inverts the apparatus. The upper portion of the apparatus 1150 is flat and parallel to the lower base of the heating vessel. The upper portion (upper surface) of the apparatus and the side of the apparatus that interfaces with the inner surface of the heating vessel are perpendicular. In both versions, concentrate deposited on the edge of the apparatus liquefies and is distributed around the heating vessel.

Figure 12:
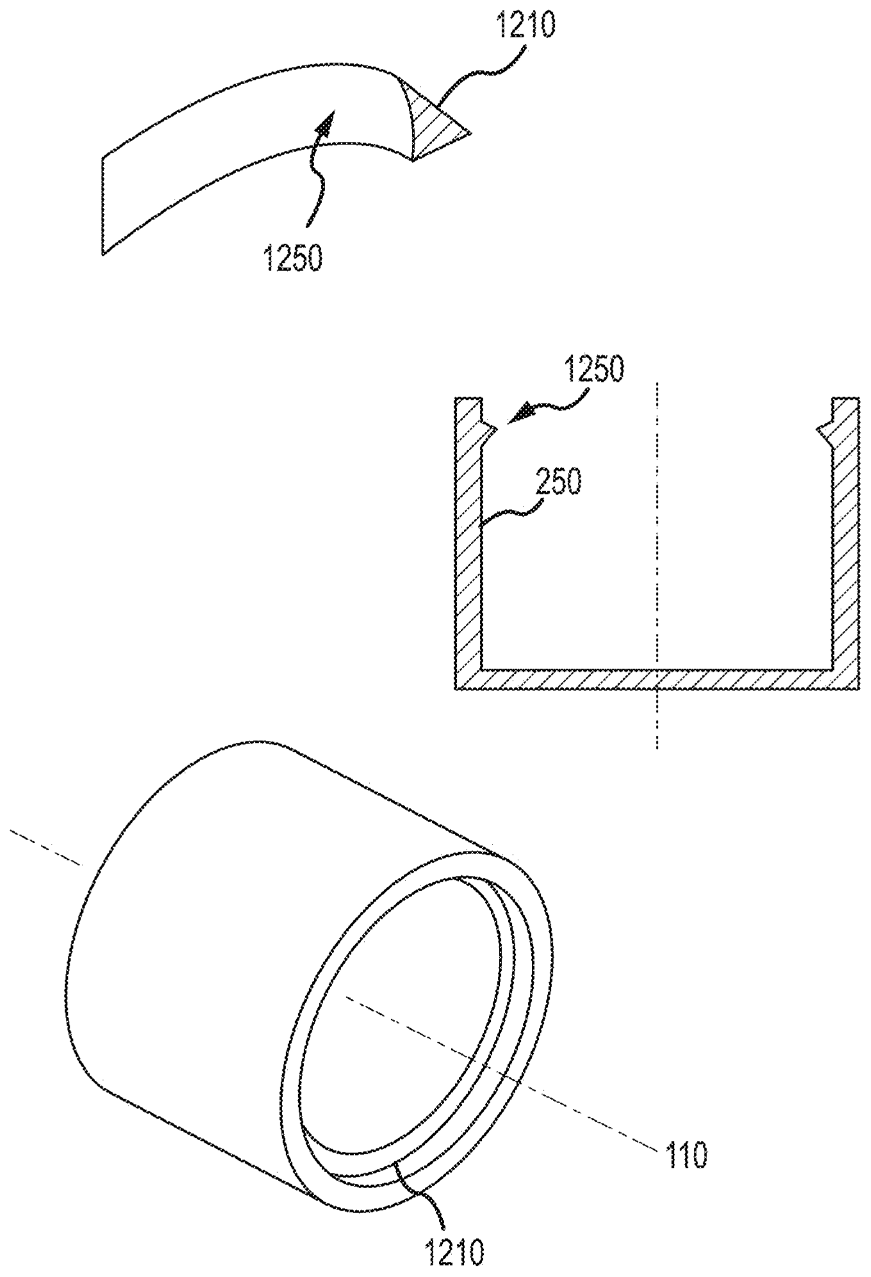
FIG. 12 is a perspective view of one embodiment of a vaporizer coil concentrate delivery system circumscribing the interior cylindrical surface of the heating vessel having a triangular cross-section with at least one curvilinear side.

FIG. 12 is a perspective view of one embodiment of a vaporizer coil concentrate delivery system circumscribing the interior cylindrical surface 250 of the heating vessel having a triangular cross-section 1210 with at least one curvilinear side 1250. In this embodiment the apparatus increasingly extends toward the center axis of the heating vessel moving from the upper portion of the heating vessel toward the lower portion of the heating vessel. The upper facing surface of the apparatus is curvilinear 1250. In this example the upper surface is concave meaning that the slope of the upper face decreases as it approaches the edge.

FIGS. 13A-13F present perspective views of a vaporizer coil concentrate delivery systems circumscribing the interior cylindrical surface 250 of the heating vessel having a triangular 1310 cross-section with convex 1360 and concave 1350 curvilinear sides. While the portion of the apparatus 1310 mating with the inner surface 250 of the heating vessel is linear (flat) each the upper surface of the apparatus and the lower surface of the apparatus are curvilinear (concave or convex).

Figure 13A:
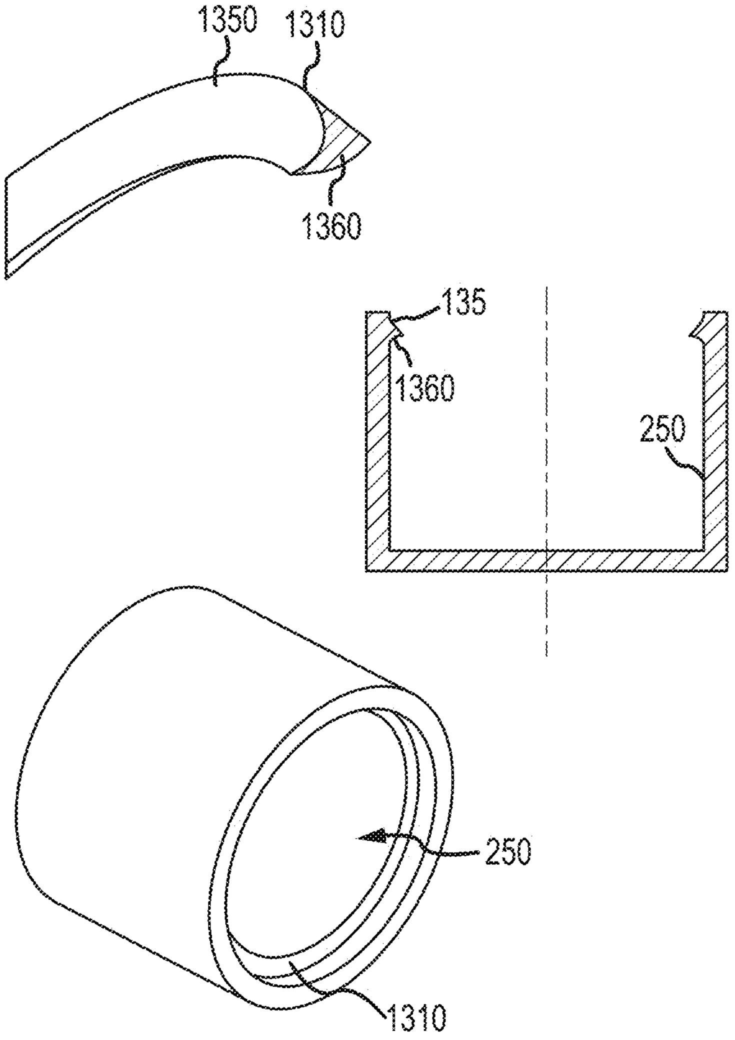
FIGS. 13A-13F present perspective views of a vaporizer coil concentrate delivery systems circumscribing the interior cylindrical surface of the heating vessel having a triangular cross-section with curvilinear sides, of which one is convex, and the other is concave.
Figure 13B:
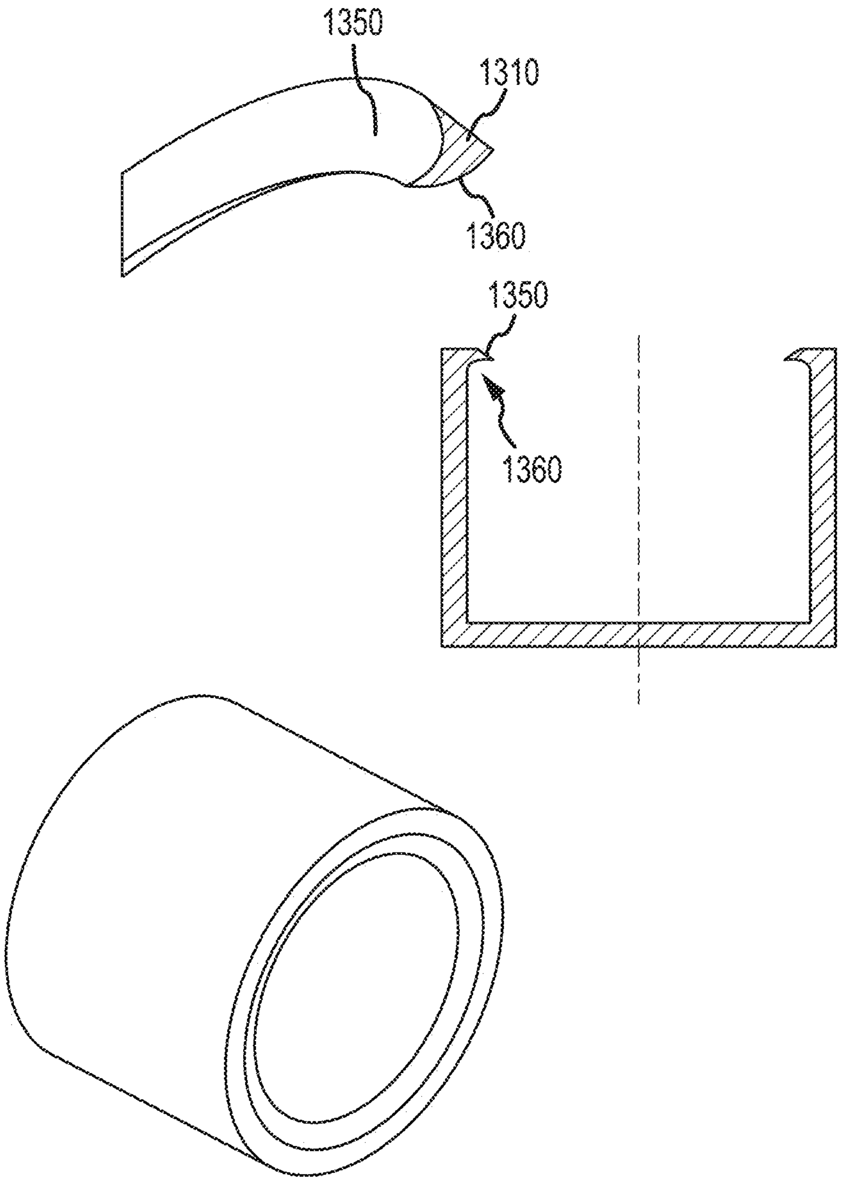
Figure 13C:
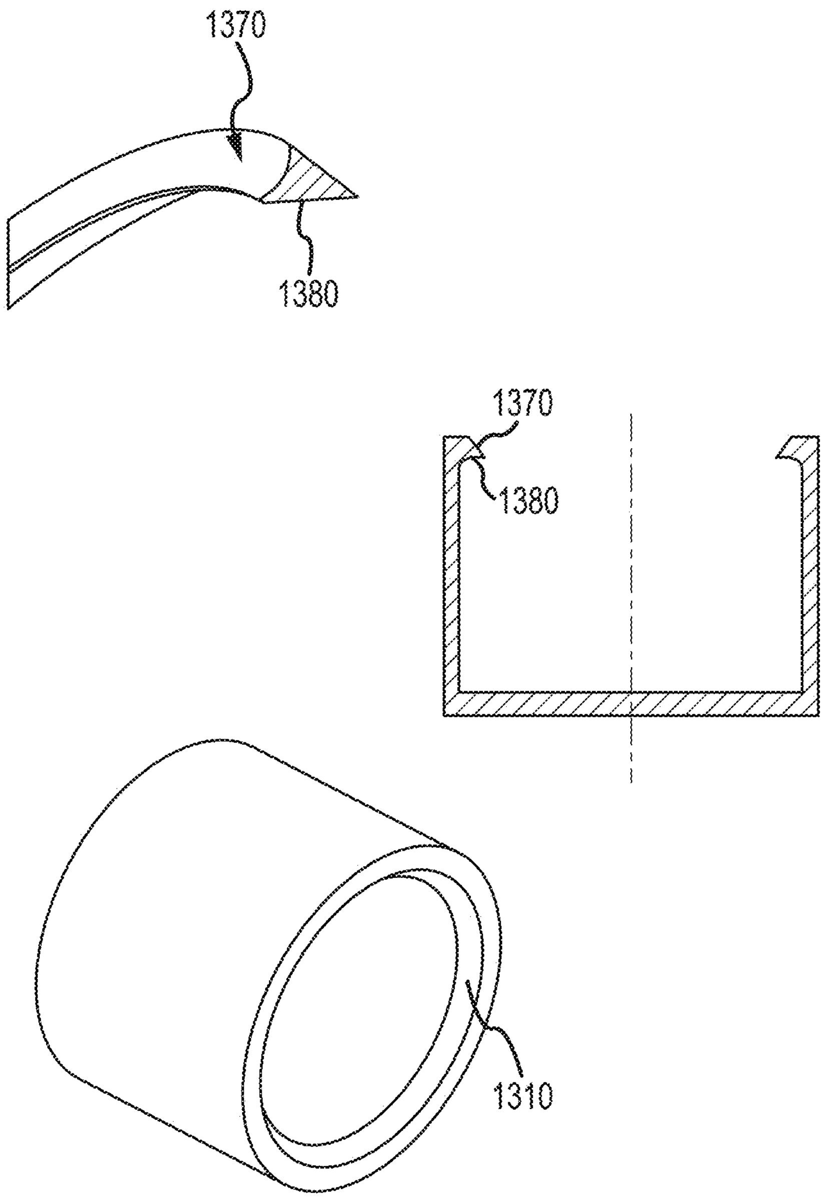

FIGS. 13A and 13B present embodiments in which the upper surface of the apparatus includes a varying degree of concavity with the lower surface being convex. FIG. 13C presents a version in which the upper service is concave with a flat, linear lower surface.

Figure 13D:
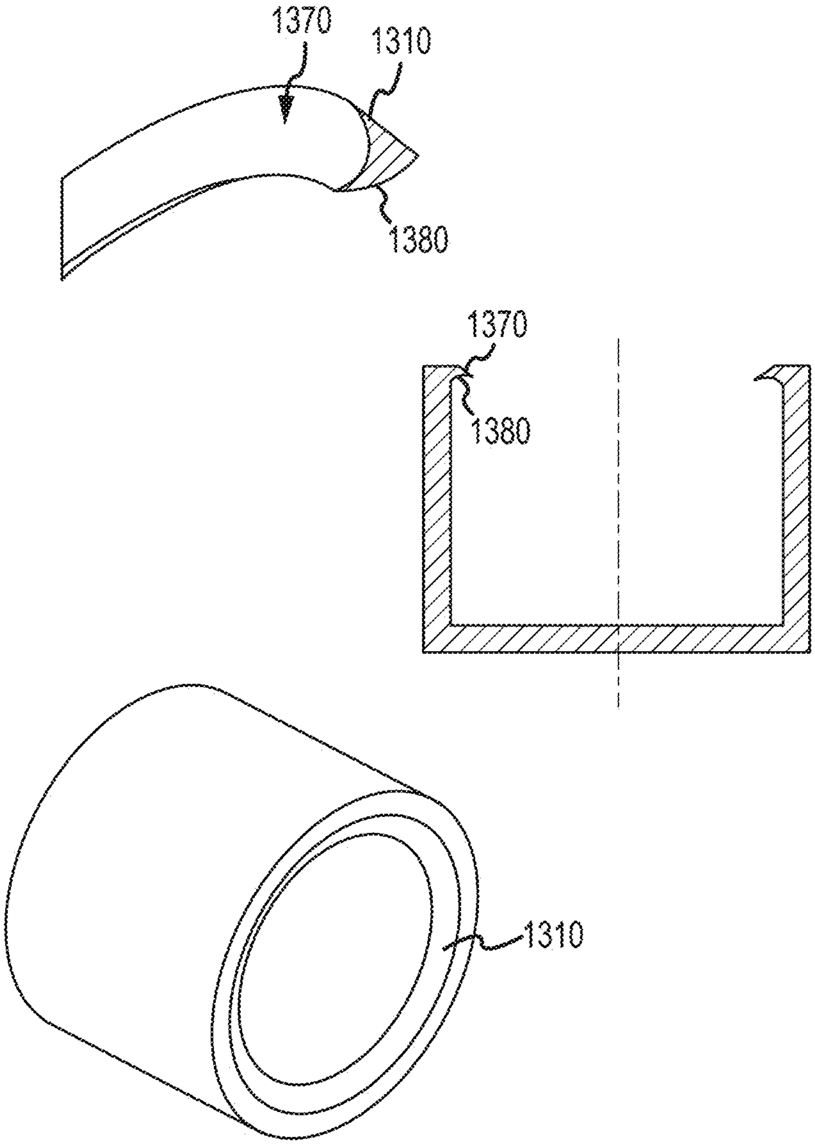
Figure 13E:
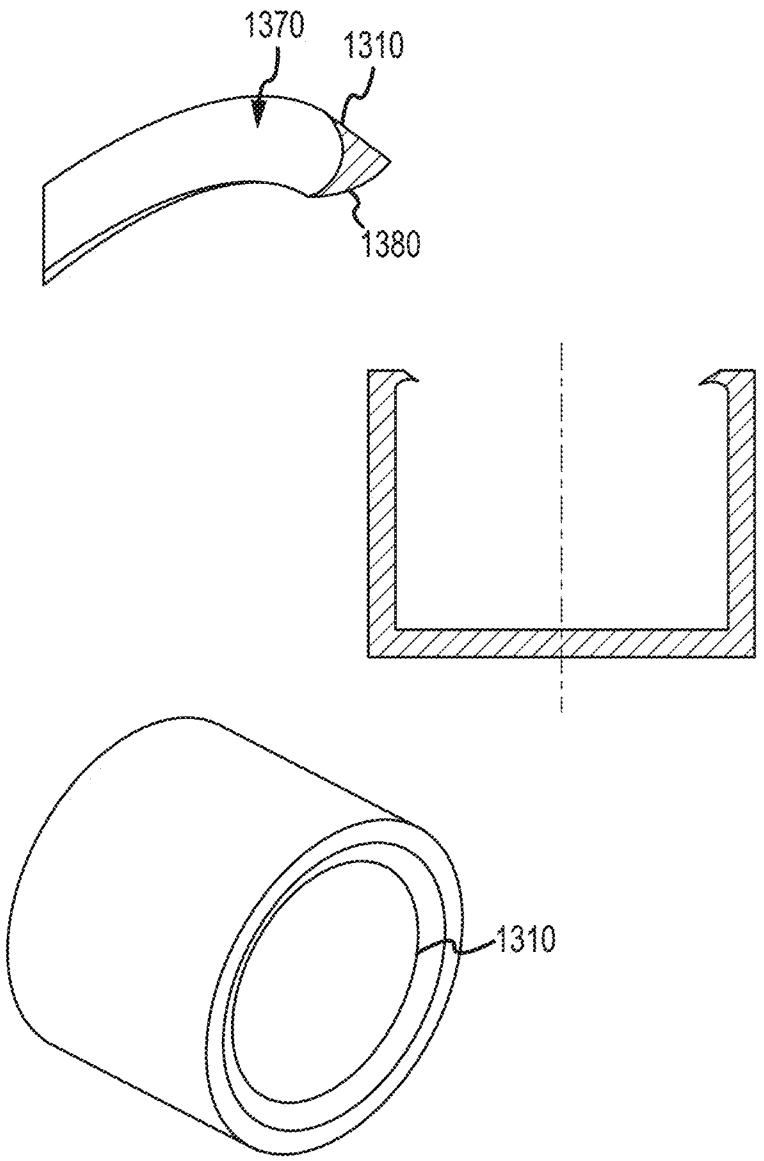
Figure 13F:
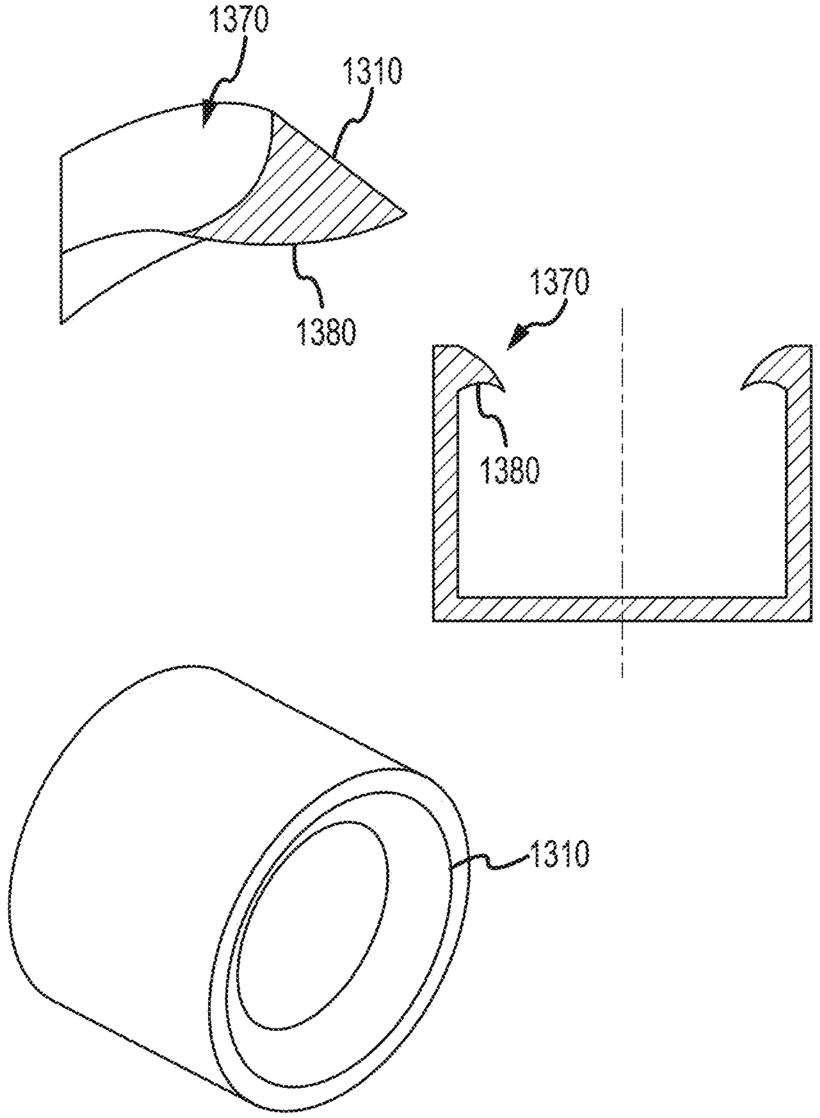

FIGS. 13D, 13E and 13F each present a concave upper surface 1370 and a convex lower surface 1380 but with varying degrees of curvature and varying degrees of depth. Each of the renditions of the concentrate delivery apparatus shown in FIG. 13 (collectively) capture the concentrate in the upper surface as a viscous substance. As the substance liquefies it travels on the lower convex surface closer to the heating source for vaporization.

Figure 14:
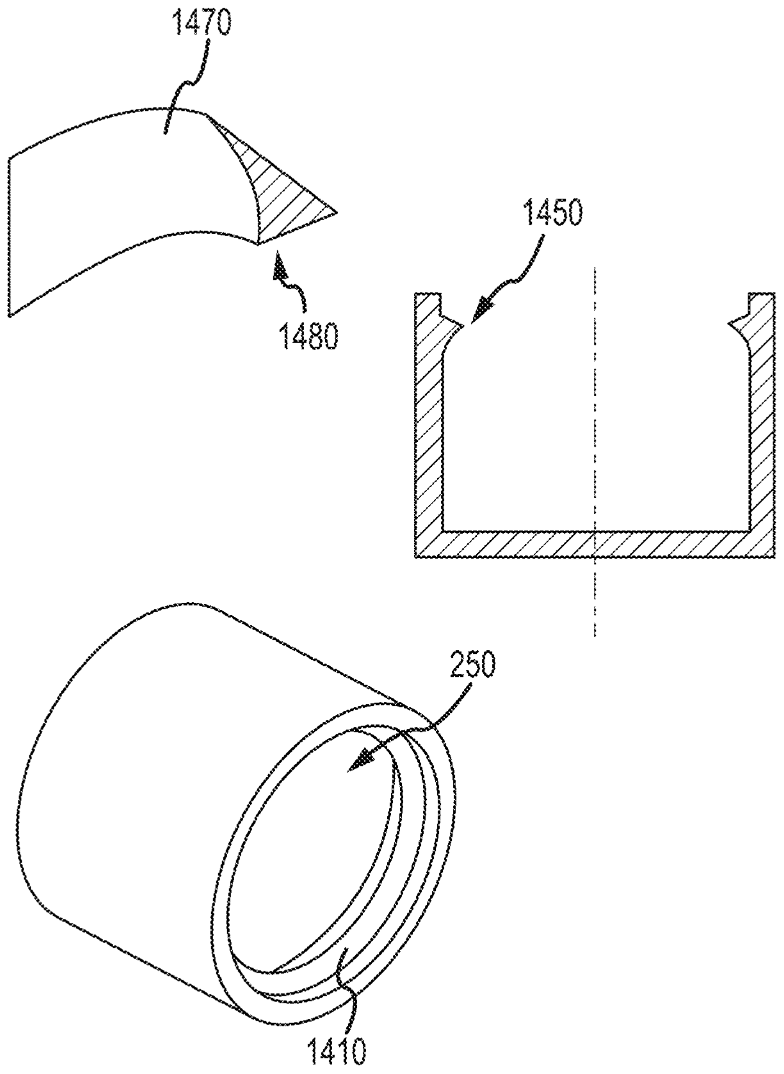
FIG. 14 is a perspective view of one embodiment of a vaporizer coil concentrate delivery system circumscribing the interior cylindrical surface of the heating vessel having a triangular cross-section with at least one curvilinear side movably positioned within the heating vessel.

FIG. 14 is a perspective view of one embodiment of a vaporizer coil concentrate delivery system circumscribing the interior cylindrical surface 250 of the heating vessel having a triangular cross-section with at least one curvilinear 1470 sides movably positioned 1450 within the heating vessel. The concentrate delivery apparatus of FIG. 14 includes a concave upper surface and a linear, flat lower surface 1480. The position of the apparatus is displaced below the upper edge of the heating vessel. According to one embodiment, the concentrate delivery apparatus is movably positioned along the interior surface of the heating vessel. The ability to position the delivery apparatus at different levels along the interior surface of the heating vessel enables a user to adjust the amount of heat exposure. In many vaporizers the heating coils or heat source is binary. It is either on or off with no adjustments as to the intensity of the heat. As the coils age or as power supplied to the coil diminishes, the intensity of the heat varies. The heat needed to liquefy and vaporize a concentrate may be readily available when the vaporizer is new or newly charged but lacking after repeated use. The ability to adjust the position of concentrate delivery apparatus extend the useful life of the device and effectiveness of the device between energy charges. The same sort of adjustment is incorporated with the various versions of the bar, presented earlier, that traverse the heating vessel.

The concentrate delivery apparatus of presented herein can be configured in multiple combinations. For example, a triangular ring extending from the inner surface of the heating vessel having curvilinear sides can be combined with several perturbations (pips) and a cross bar. In another combination a conical delivery apparatus can be combined with pips and a concave ring circumscribing the heating vessel. In yet another embodiment pips can extend from the inner surface of the heating vessel at the upper edge of the heating vessel while a triangular cross-section delivery apparatus spans the heating vessel lower, within the vessel. Each aspect of the concentrate delivery apparatus is configured to maximize efficiency in liquefying and vaporizing a concentrate while protecting the underlying heating coils.

While the invention has been particularly shown and described with reference to embodiments, it will be understood by those skilled in the art that various other changes in the form and details may be made without departing from the spirit and scope of the invention. Embodiments of the present invention and many of its improvements have been described with a degree of particularity. This description has been made by way of example.

While there have been described above the principles of the present invention in conjunction with a vaporizer concentrate delivery system, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A concentrate vapor delivery system, comprising:

a heating vessel for an electronic vaporizer having a central axis and an interior cylindrical surface wherein the heating vessel is cylindrical and includes a bottom surface;

one or more heating elements positioned within the heating vessel; and a concentrate delivery apparatus extending from the interior surface within the heating vessel configured to accept a concentrate suitable for vaporization wherein the concentrate delivery apparatus extends uniformly inward from the interior cylindrical surface of the heating vessel toward the central axis of the heating vessel and wherein the concentrate delivery apparatus includes a first curvilinear surface extending from the interior cylindrical surface toward the central axis forming an interior edge and a second linear surface extending from the interior edge back to the interior cylindrical surface of the heating vessel thereby joining the interior cylindrical surface of the heating vessel at a lower edge and wherein the second linear surface is configured to transport liquified concentrate from the interior edge of the concentrate delivery apparatus to the lower edge of the concentrate delivery apparatus and wherein the lower edge is proximate to the one or more heating elements whereby liquified concentrate vaporizes.

2. The concentrate vapor delivery system of claim 1 wherein the concentrate delivery apparatus is movably proximate to the one or more heating elements.

3. The concentrate vapor delivery system of claim 1 wherein the concentrate delivery apparatus is internally heated.

4. The concentrate vapor delivery system of claim 1 wherein the heating vessel is a cylindrical heating vessel and wherein concentrate delivery apparatus spans the heating vessel perpendicular to the central axis.

5. The concentrate vapor delivery system of claim 1 wherein the concentrate delivery apparatus is movable positioned within the heating vessel relative to the central axis thereby to be proximate to the one or more heating elements.

6. The concentrate vapor delivery system of claim 1 wherein the one or more heating elements are positioned at the bottom of the heating vessel and wherein the concentrate delivery apparatus spirals downward toward the bottom of the heating vessel and is configure to transport liquified concentrate from an upper portion of the concentrate delivery apparatus to a lower portion of the concentrate delivery apparatus proximate to the one or more heating elements whereby liquified concentrate vaporizes.

7. The concentrate vapor delivery system of claim 1, wherein the concentrate delivery apparatus is movably positioned along the interior cylindrical surface of the heating vessel relative to the central axis.

8. The concentrate vapor delivery system of claim 4 wherein the concentrate delivery apparatus bisects the heating vessel traversing the central axis.

9. The concentrate vapor delivery system of claim 4 wherein the concentrate delivery apparatus is a hollow tube with a circular cross-section.

10. The concentrate vapor delivery system of claim 4 wherein the concentrate delivery apparatus is movably positioned within the heating vessel relative to the central axis thereby to be proximate to the one or more heating elements.

11. The concentrate vapor delivery system of claim 4 wherein the concentrate delivery apparatus includes a conical funnel with a smaller opening and a larger opening, the small opening oriented below the large opening and the smaller opening proximate to a lower portion of the heating vessel.

12. The concentrate vapor delivery system of claim 4 wherein the concentrate delivery apparatus includes a plurality of perturbations extending from the inner surface of the heating vessel.

13. The concentrate vapor delivery system of claim 4 wherein the heating vessel includes a bottom surface and wherein the concentrate delivery apparatus further extends uniformly inward from the interior cylindrical surface of the heating vessel toward the central axis of the heating vessel.

* * * * *